May 31, 1932.  J. C. McCUNE  1,860,424
SAFETY BRAKE DEVICE
Filed Jan. 21, 1930
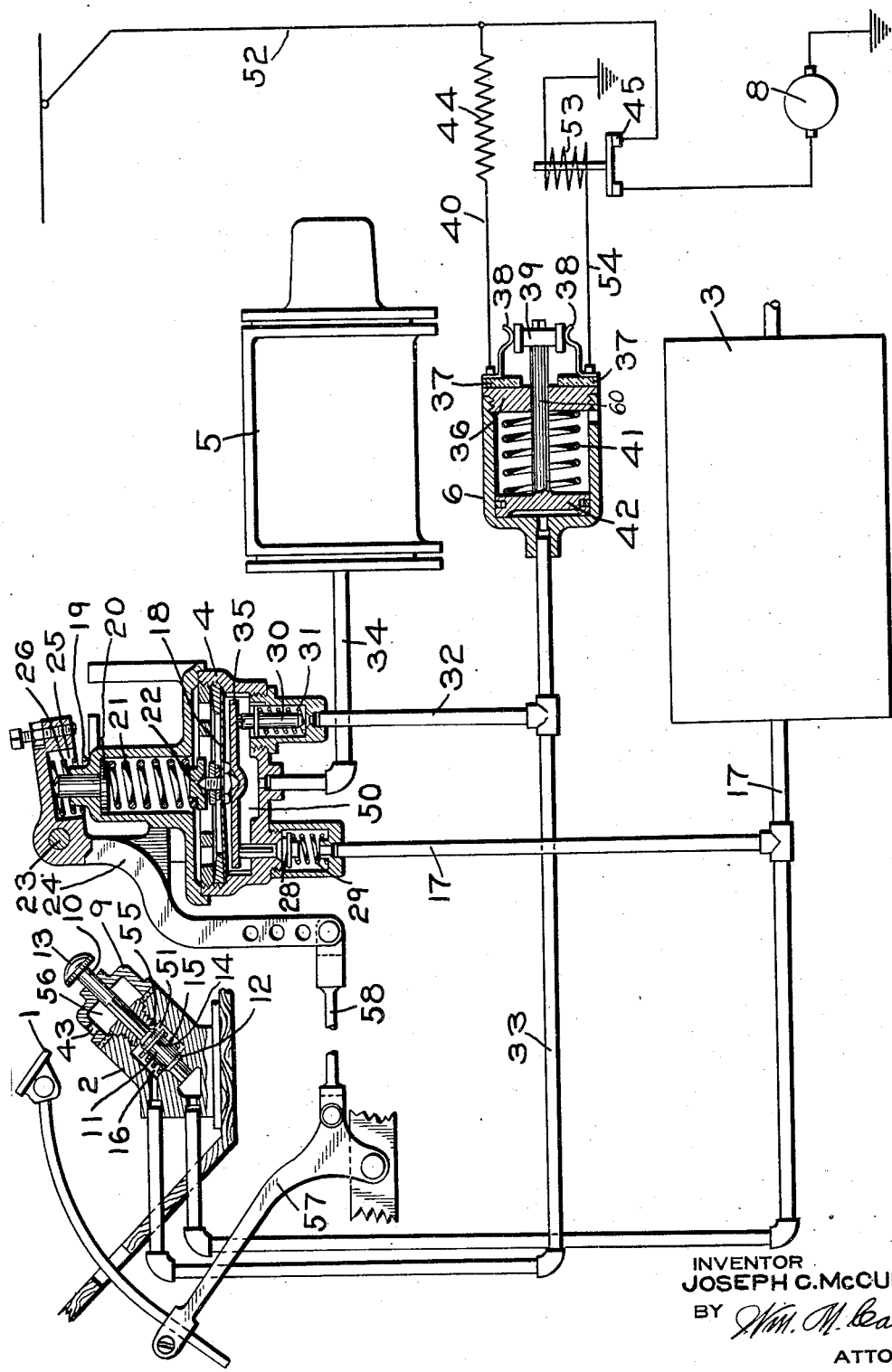
INVENTOR
JOSEPH C. McCUNE
BY Wm. M. Cady
ATTORNEY Patented May 31, 1932

1,860,424

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

SAFETY BRAKE DEVICE

Application filed January 21, 1930. Serial No. 422,303.

This invention relates to brake controlling equipment of the type in which brakes are automatically applied when the operator of the vehicle becomes incapacitated and adapted more particularly for use on passenger buses of the trackless type.

One object of my invention is to provide an equipment of the above character having improved means for automatically applying the brakes when the operator becomes incapacitated.

Another object of my invention is to provide a vehicle controlling means, wherein a safety control valve and a service brake pedal are adapted to be operated by one foot of the operator of the vehicle.

In the accompanying drawing, a diagrammatic view of a safety brake equipment and a controlling mechanism therefor, as constructed in accordance with my invention, is shown.

As shown in the drawing, the apparatus comprises a service brake operating pedal 1, a safety control valve device 2, a main reservoir 3, a brake device 4, a brake cylinder 5, and interlock switch device 6.

The safety control valve device comprises a casing having a hollow cap 9, a valve stem 10 extending through a bore in the cap and fluted intermediate its ends. A double beat valve 11 is formed on the valve stem intermediate its ends and adapted to seat in one direction on valve seat 12 when the vehicle operator applies foot pressure to a head 13 on the valve stem 10. A collar 14 is formed integral with the double beat valve 11, and a coil spring 15, seated in a recess 16 of the safety control valve device 2 engages the underside of the collar 14 and tends to move the stem 10 outwardly of the casing 8 of the safety control when pressure or weight is removed from the head of the valve stem. The main reservoir 3 is connected to the safety valve casing by a pipe 17.

The brake valve device 4 comprises a casing formed in two parts between which a flexible diaphragm 18 is secured, forming a pressure chamber in the lower part of the casing. The cap or upper part of the casing is provided with an opening through which a pin 19 extends. A shoulder 20 is formed on the lower end of the pin 19 to limit the outward movement of same and also to act as a bearing base for one end of a coil spring 21. The lower end of said coil spring seats on a plate 22 through which the pressure of spring 21 is transmitted to diaphragm 18. Pivotally mounted at 23 on the casing 4 is an L-shaped arm 24, which is adapted to engage the pin 19 so as to compress spring 21. One end of the arm 24 is provided with a recess 25 in which is mounted a coil spring 26, the lower end of said coil spring bearing against the top of the casing 4 and tending to hold the recess end of the arm out of engagement with the pin 19.

An inlet valve 28 is mounted in the casing 4 and controls fluid under pressure from pipe 17, leading from the main reservoir 3, to pressure chamber 50. A rocking bar 35 which is operatively connected to the diaphragm 18, engages the stem of valve 28, and a spring 29 urges the valve to its seat.

A release valve 30 is also mounted in the casing and has a stem adapted to engage the bar 35. A coil spring 31 tends to hold the valve 30 unseated. Instead of the release valve 30 controlling direct communication from chamber 50 to the atmosphere, the valve controls communication from said chamber to a pipe 32, which is connected to a pipe 33, leading to valve chamber 51 of the safety control valve device 2.

The interlocking switch device 6 comprises a cylinder containing a piston 42. One end of the cylinder of said interlocking switch is closed by a screw plug 36. Mounted on insulating blocks 37 and secured to the plug 36 are contact switch points 38. A contact member 39 mounted on the free end of the stem of piston 60 is adapted to connect and close a circuit 40 through the contact members 38. A coil spring 41 acts on piston 42 and tends to maintain the piston in a position in which the contact member 39 engages the contacts 38.

The circuit from the motor 8, which is the driving motor of the vehicle, to the trolley wire 52 is controlled by a switch member 45 and the operation of the switch member is controlled by a magnet coil 53. The current for energizing the coil 53 is supplied from the trolley wire 52 through a resistance and a wire 40 connected to one of the switch contacts 38. The other switch contact 38 is connected to a wire 54, leading to the coil 53.

The L-shaped arm 24 and the foot service brake pedal 1 are connected by a pivoted crank 57 and a connecting rod 58. It is to be understood that the service brake pedal and the safety control valve are operated by the same foot of the operator of the vehicle, and that pressure must be maintained on the head 13 of the valve 10 by the heel of the operator while using the ball of the foot for making a service application of the brakes.

In operation, with no pressure applied to the service brake pedal 1, the spring 21 in the brake valve device is not under pressure and the diaphragm 18 does not exert pressure on the valve stem of the inlet and release valves 28 and 30. The inlet valve 28 is then held seated by spring 29, while the release valve 30 is held unseated by spring 31. If the push button 13 is held depressed by the foot of the operator, the double beat valve 11 will be held seated on the seat 12, while it will be unseated at the seat 55. With the double beat valve in this position, the pipe 33 is open to the atmosphere by the way of chamber 56 and atmospheric exhaust port 43.

The pressure chamber 50 of the brake valve device and consequently brake cylinder 5, which is connected to said chamber through pipe 34, is therefore vented to the atmosphere.

Assuming that the vehicle is travelling with the braking apparatus in position as stated above and it is desired to make a service application of the brakes, pressure is applied to the foot operating pedal while still maintaining a pressure on the valve stem 10, which causes the L-shaped arm 24 to swing on its pivot 23, thus moving the free end of said arm downwardly into engagement with the pin 19 and continuing the pressure until the pin 19 is moved so as to compress the spring 21 against the diaphragm 18. The diaphragm is then moved by spring pressure so as to depress the bar 35. The movement of bar 35 first acts to seat the valve 30 and then to unseat the valve 28, thereby permitting the fluid under pressure from main reservoir 3 to flow to chamber 50, then by means of pipe 34 to pass on into the brake cylinder 5. This movement will in no way affect the interlocking switch 6, as the closed valve 30 will prevent fluid under pressure from entering same. When the pressure of fluid in chamber 50 and the brake cylinder has been increased sufficiently to overcome the pressure of spring on the diaphragm 18, the diaphragm will be moved upwardly so as to permit the valve 28 to seat and cut off the further supply of fluid under pressure to the brake cylinder, thereby maintaining the brakes in what is known as a lap position.

Should the operator of the vehicle become incapacitated and remove the weight of his foot from the head of the valve stem 10, the said valve stem would be moved in an upwardly direction by the tension of the coil spring 15, so that the double beat valve 11 will seat at 55 and will unseat at the valve seat 12. Fluid under pressure will then be supplied from the main reservoir 3 to pipe 33, and if the brake device is in release position, fluid under pressure will be supplied from pipe 32 past the unseated valve 30 to chamber 50 and through pipe 34 into the brake cylinder 5, thus making an emergency application of the brakes. At the same time the fluid under pressure is entering the brake cylinder, the same is also passing into the cylinder of the interlocking switch 6 to force the piston 42 outwardly against the tension of the spring 41, thereby breaking the circuit 40 at contact points 38 which deenergizes the magnet 53 to allow the switch 45 to open, thus stopping the motor 8.

From the foregoing description, it can be readily seen that in order to release the brakes, the valve stem 10 must be moved to the position shown in the drawing, thus the fluid under pressure is permitted to flow from the brake cylinder and the interlocking switch cylinder through pipes 34, 32 and 33 to the safety control valve device and then exhausted to the atmosphere by the way of the chamber 56 and exhaust port 43.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake equipment, the combination with a brake cylinder and a brake valve device for controlling the admission to and the release of fluid under pressure from the brake cylinder, of a safety control valve device movable by the operator to establish communication through which fluid is released from the brake cylinder by operation of said brake valve device and operative upon release by the operator to supply fluid under pressure to the brake cylinder.

2. In a fluid pressure brake equipment, the combination with a brake cylinder and a brake valve device for controlling the admission to and the release of fluid under pressure from the brake cylinder, a foot pedal for operating the brake valve device to permit admission of fluid under pressure to the brake cylinder, and a safety control valve movable by the operator to establish communication through which fluid is released from the brake cylinder and operative upon release by the operator to supply fluid under pressure to the brake cylinder.

3. In a fluid pressure brake equipment, the combination with a brake cylinder and a brake valve device for controlling the admission to and the release of fluid under pressure from the brake cylinder, a foot pedal for operating the brake valve device, a safety control valve device adjacent the foot pedal and movable by the operator for supplying to and exhausting fluid under pressure from the brake cylinder.

4. In a vehicle controlling mechanism, the combination with a fluid pressure brake including a brake cylinder and a brake valve device for controlling the admission and release of fluid under pressure to and from the brake cylinder, of a motor for driving the vehicle, a circuit through which the operation of the motor is controlled, electrically operated switch means for controlling the opening and closing of said circuit, and manually operable valve means for controlling communication through which fluid is released from the brake cylinder by operation of said brake valve device and operative upon the relief of manual pressure for effecting an application of the brakes and the operation of said electrically operated switch means to open said circuit.

5. In a vehicle controlling mechanism, the combination with a fluid pressure brake including a brake cylinder and a brake valve device for controlling the admission and release of fluid under pressure to and from the brake cylinder, of a motor for driving the vehicle, a circuit through which the operation of the motor is controlled, a switch for controlling the opening and closing of said circuit, a fluid pressure operated piston for controlling operation of said switch, and manually operable valve means for controlling communication through which fluid is released from the brake cylinder by operation of said brake valve device and operative upon relief of manual pressure for supplying fluid under pressure to the brake cylinder and to said piston to operate said switch to open said circuit.

In testimony whereof I have hereunto set my hand, this 17th day of January, 1930.

JOSEPH C. McCUNE.